United States Patent [19]

Norwood, Sr.

[11] 4,433,656

[45] Feb. 28, 1984

[54] AUTOMOTIVE OIL FILTER PRECHARGING ARRANGEMENT

[76] Inventor: Joseph E. Norwood, Sr., 312 Keyser Ave., Petersburg, W. Va. 26847

[21] Appl. No.: 400,753

[22] Filed: Jul. 22, 1982

[51] Int. Cl.³ .............................................. F01M 1/00
[52] U.S. Cl. ............................. 123/196 A; 123/196 R; 123/196 S; 184/6.3; 210/444
[58] Field of Search ........ 123/196 R, 196 A, 196 CP, 123/196 S; 184/6.24, 6.3; 210/418, 420, 444

[56] References Cited

U.S. PATENT DOCUMENTS

| | | | |
|---|---|---|---|
| 1,380,276 | 5/1921 | Ward | 123/196 R |
| 1,702,348 | 2/1929 | Kraljevich | 123/196 R |
| 2,102,514 | 12/1937 | Clarkson | 184/6 |
| 2,110,662 | 5/1937 | Fisher | 123/196 R |
| 2,327,011 | 8/1943 | Bolser | 123/196 A |
| 2,375,765 | 5/1945 | Briggs | 123/196 A |
| 2,736,307 | 2/1956 | Wilcox | 123/196 S |
| 2,747,564 | 5/1956 | Wehling | 123/196 S |
| 2,755,787 | 7/1956 | Butler | 123/196 |
| 2,838,039 | 6/1958 | Smith | 123/196 R |
| 3,295,507 | 1/1967 | Carter | 123/196 R |
| 3,422,807 | 1/1969 | Waldecker | 123/196 S |
| 3,474,884 | 2/1969 | Braun | 184/6.3 |
| 3,842,937 | 10/1974 | Lippay | 123/196 S |
| 3,982,520 | 9/1976 | Wheeler | 123/196 A |
| 4,061,204 | 12/1977 | Kautz | 184/6.3 |
| 4,151,823 | 5/1979 | Grosse | 123/196 A |

OTHER PUBLICATIONS

1964 GMC Service Manual, Sec. 0, p. 11.
1965 GMC Service Manual, Sec. 6A, pp. 204, 205.

Primary Examiner—Charles J. Myhre
Assistant Examiner—E. Rollins Cross
Attorney, Agent, or Firm—Schuyler, Banner, Birch, McKie & Beckett

[57] ABSTRACT

A port proximate to an automotive oil filter, and a closure therefor, used to precharge a newly installed oil filter with oil. The port may be located either in an adaptor mounting plate, which is located between the filter and the engine block, or in the engine block itself. The port is in fluid communication with the filter, allowing a newly installed filter to be precharged with oil to minimize engine wear.

4 Claims, 6 Drawing Figures

AUTOMOTIVE OIL FILTER PRECHARGING ARRANGEMENT

TECHNICAL FIELD

This invention relates to an arrangement for precharging newly installed automotive oil filters and, more particularly, to a closable port located proximate to an automotive oil filter mount through which oil is conveyed into a newly installed filter to provide an immediate source of oil for the engine before starting to minimize engine wear.

BACKGROUND OF THE INVENTION

For proper operation, the lubricating oil for an automotive internal combustion engine should be changed regularly, because the oil becomes dirty and less viscous, making it less effective in protecting the engine against wear. It is also a regular practice to change the oil filter when the oil is changed, because the oil filter becomes dirty as the oil becomes dirty. Unfortunately, after an engine's oil and filter have been changed, the engine usually is only slightly lubricated, because the oil changing procedure results in most of the new oil being located in the sump of the engine, with the filter empty. As a result, when the engine is initially started up after an oil change, a short span of time exists before sufficient operating oil pressure is developed during which the filter is filled by the engine oil pump—a time span during which the engine is without proper lubrication, causing excessive wear of the engine. It has been estimated that a typical engine could last at least 20% longer before wearing out if oil could be supplied immediately to the engine upon start-up after each oil change.

The prior art has dealt extensively with the problem of the immediate lubrication needs of an engine after start-up. The prior art has attempted to solve the problem by providing auxiliary lubrication systems. Carter U.S. Pat. No. 3,295,507, which uses an auxiliary electric oil pump, is typical. The Carter lubrication system utilizes the auxiliary pump, which is attached to the oil sump, to generate sufficient oil pressure when the ignition key is turned but before the engine is started. Of course, the system will inherently charge a newly installed oil filter. A filter adaptor attaching the oil filter to the engine block is connected to the auxiliary pump. The adaptor contains a pressure sensor which indicates to the driver by means of an indicator light that sufficient oil pressure has been generated by the auxiliary pump to allow start-up of the engine. Other prior art systems have used pressurized oil reservoirs that discharge oil into the engine before start-up. There also will inherently charge a newly installed oil filter. Typical of these kinds of systems is Waldecker U.S. Pat. No. 3,422,807, which discloses an oil reservoir mounted on an engine. When the engine starter switch is closed, the reservoir discharges oil into the engine to temporarily lubricate it until the engine oil pump generates sufficient oil pressure. The reservoir is filled by the lubrication system after start-up in preparation for the next start-up. Still other devices include packaged oil filters which are precharged with oil.

The prior art solutions to the engine lubrication problem have several drawbacks. First, they add unnecessary equipment and expense to the engine. Auxiliary pumps, oil lines and reservoirs take up valuable space in an already cramped modern engine compartment and add to the present high cost of an automobile. Second, the prior art systems increase complexity, adding to the number of parts that can malfunction in a modern engine. In addition, the prior art systems add weight to the engine, a very undesirable result at a time when automotive manufacturers strive to make their products lighter and more fuel efficient. Precharged oil filters are costly, messy to install, and cannot be readily installed on engines where the apertured base of the oil filter faces downwardly.

SUMMARY OF THE INVENTION

It is therefore the object of the present invention to obviate the above noted disadvantages and drawbacks of the prior art by providing an oil filter precharging arrangement which is simple in construction, inexpensive to manufacture, easy and neat to use, and permits continued use of conventional spin-on oil filters.

The above and other objects of the invention are accomplished by providing, in one embodiment, an adaptor for mounting and precharging with oil a spin-on type of oil filter on an internal combustion engine. The adaptor comprises a mounting plate adapted to be mounted on the filter mounting means. The adaptor has an engine mating surface adapted to contact the usual oil filter mounting surface on the engine block, including a gasket thereon to create a tight seal between the two mating surfaces. An oil filter mounting surface is located on the side of the plate opposite to the engine mounting surface, and a central aperture extends through the plate from the engine mating surface to the oil filter mounting surface.

An adaptor nipple is also included, replacing the usual threaded engine nipple in the engine block. The adaptor nipple has a threaded filter engaging portion adapted to matingly engage the threaded central mounting hole of the filter, and a threaded engine mounting portion smaller in diameter than the mounting plate central aperture. The engine mounting portion of the adaptor nipple extends through the central aperture in the mounting plate and is adapted to matingly engage the engine block. A retaining flange extends outwardly from the adaptor nipple between the threaded filter engaging portion and the threaded engine mounting portion to engage the adaptor plate and retain it on the engine block.

A plurality of holes are annularly arranged around the plate central aperture and pass through the plate to provide fluid communication between the opposite plate surfaces. A port is located in the periphery of the plate in fluid communication with one of the plurality of plate holes to provide a means by which the filter may be precharged by oil. A closure means is also included to seal the port after the filter has been charged with oil.

In another embodiment, an internal combustion engine, which has a typical lubrication system including oil passages in the engine block, and mounting means on the block for a filter which is in the flow of the oil, includes an externally accessible port in the engine block located proximate to the filter mounting means. The port is in fluid communication with the oil passages leading to the filter through the mounting means. The port allows manual introduction of oil into an empty, newly installed filter, before the engine is started, to minimize wear of the engine. A closure means for closing the port after the filter has been charged with oil is included.

An extension tube may be provided in fluid communication with the port in the adaptor of the first embodiment, or with the port in the engine block of the second embodiment. The tube extends upwardly from the port to a height above the filter to allow the filter to be precharged with oil, regardless of the orientation of the filter.

DETAILED DESCRIPTION

Figure 1:
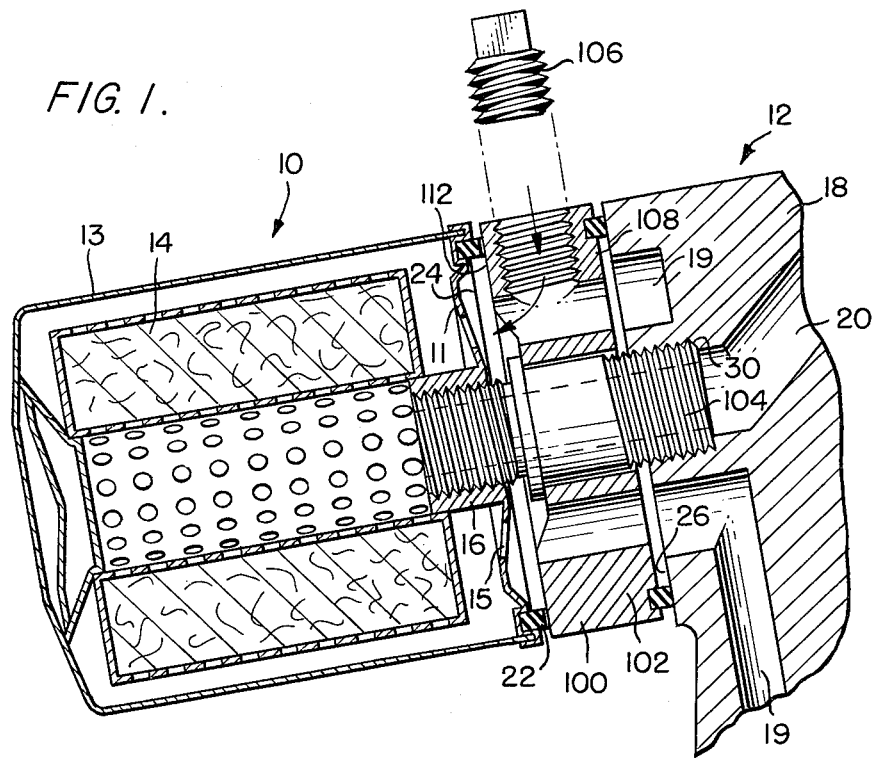
FIG. 1 is a cross-sectional view of one embodiment of the present invention.

As seen in FIGS. 1 through 6, there is shown generally a replaceable oil filter 10 mounted on an internal combustion engine 12. Filter 10 can be any typical automotive oil filter, such as the spin-on type having a bottom plate 11 attached to a cylindrical housing 13, which contains filter element 14. Inlet holes 15 are annularly arranged about an internally threaded central mounting hole 16 in bottom plate 11.

Engine 12 can be any typical automotive power plant having an engine block 18, inlet oil passages 19, and an outlet oil passage 20. In the normal engine operation, oil is pumped from the sump of the engine (not shown) through inlet oil passages 19 to oil filter 10. The oil enters filter 10 through inlet holes 15 and passes through filter element 14. The oil is then sent through central mounting hole 16 by means of a nipple (to be described later) into outlet oil passage 20 and subsequently into the internal working components of engine 12. A gasket 22 is usually located on the bottom or mating surface of filter bottom plate 11 to seal the area between filter 11 and engine block 16 to prevent oil leakage.

Figure 2:
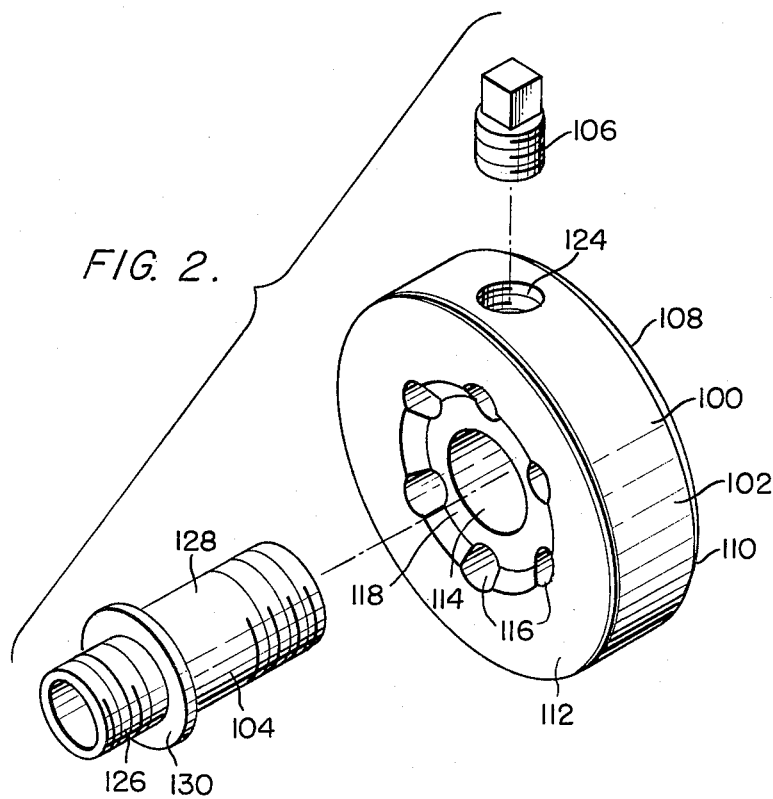
FIG. 2 is an exploded view of the embodiment of FIG. 1.
Figure 3:
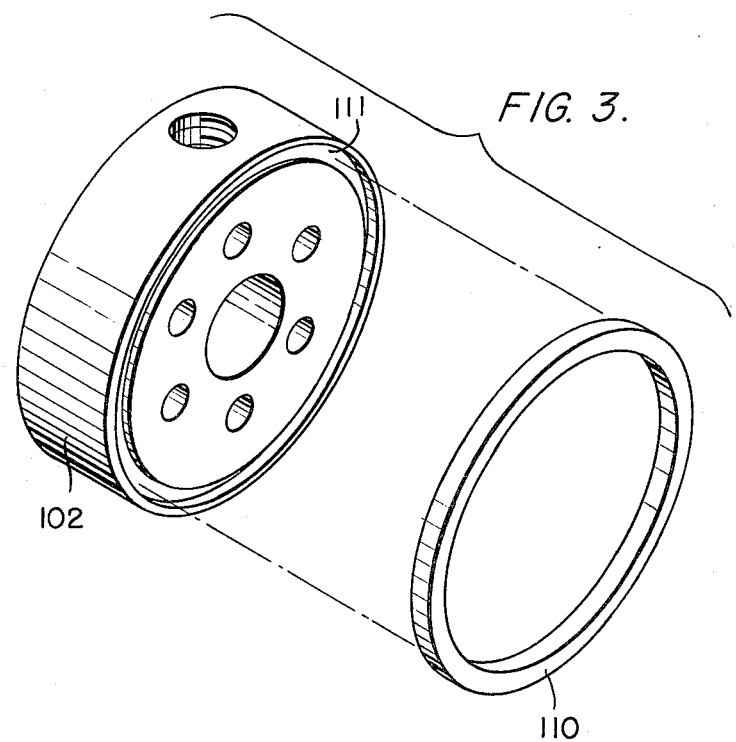
FIG. 3 is another exploded view of the embodiment of FIGS. 1 and 2.

In one embodiment of the invention, as show in FIGS. 1 through 3, an adaptor 100 for mounting and precharging with oil a spin-on type of oil filter 10 is mounted on engine block 16 between filter 10 and block 16. The adaptor 100 comprises a mounting plate 102, a threaded nipple 104, and a threaded plug 106. Plate 102 is preferably round and of a diameter at least equal to the diameter of filter bottom plate 11. Plate 102 has an engine mating surface 108, which faces the oil filter mounting surface 26 on the engine block 14. As seen in FIG. 3, a sealing gasket 110 is fitted within a groove 111 located on the engine mating surface 108. The gasket 110 acts to seal the contact between mating surface 108 and mounting surface 28 to prevent oil leakage. On the opposite side of plate 102 is an oil filter mounting surface 112, which faces the bottom surface 24 of oil filter bottom plate 11. Gasket 22 serves to seal the contact between bottom filter surface 24 and oil filter mounting surface 112.

Included in plate 102 is a central aperture 114. A plurality of inlet holes 116 in plate 102 are annularly arranged about aperture 114. Holes 116 are positioned in plate 102 at approximately the same radial distance from the center as inlet holes 15 in oil filter plate 11.

Thus, the plate holes 116 allow oil passing through plate 102 to enter filter 10 by way of inlet holes 15. As a result, the plate 102 does not interfere with the normal operation of filter 10. Located on the oil filter mounting surface 112 is a depression 118, which encompasses central aperture 114 and plate holes 116. The depression 118 allows oil to enter filter 10 rapidly through all inlet holes 15.

A threaded port 124 is located in the periphery of plate 102, as seen in FIG. 2, and is in fluid communication with one of the plate holes 116. Port 124 provides a means by which oil may be poured or pumped manually into filter 10. Threaded plug 106 is adapted to matingly fit port 124 so that plug 106 seals port 124 when in place.

As best seen in FIG. 1, filter 10 is mounted to engine block 18 by means of threaded nipple 104, which also secures plate 102 to block 18 between filter 10 and block 18. Adaptor nipple 104, seen best in FIG. 2 replaces the standard engine nipple and comprises a threaded filter engaging portion 126 separated from a threaded engine mounting portion 128 by a retaining flange 130, which extends outwardly from the adaptor nipple 104. Threaded filter portion 126 is adapted to matingly engage threaded central aperture 16 on filter 10. Threaded engine mounting portion 128 has a diameter smaller than central aperture 114, thereby allowing it to pass through aperture 114. Portion 128 is adapted to matingly engage threaded engine block hole 30. Filter portion 126 thus attaches filter 10 to nipple 104, which in turn holds plate 102 to engine block 18 by means of flange 130 and engine mounting portion 128. Flange 130 is wholly contained within depression 118. The internal bore of adaptor nipple 104 may be hexagonal to facilitate its tightening into hole 30.

In operation, after filter 10 has been replaced with a new filter, plug 106 is unscrewed from port 124 and fresh oil is fed through port 24 by any suitable means, such as a funnel, spout or oil pump gun. The oil travels through port 124 into depression 118 via one plate hole 116. The oil then passes through all plate holes 116 into filter 10 by means of filter access holes 15. After the filter 10 is filled with oil, plug 106 is replaced into port 124, and oil is readily in filter 10 to engine 12 upon start-up so that minimum engine wear occurs.

Figure 4:
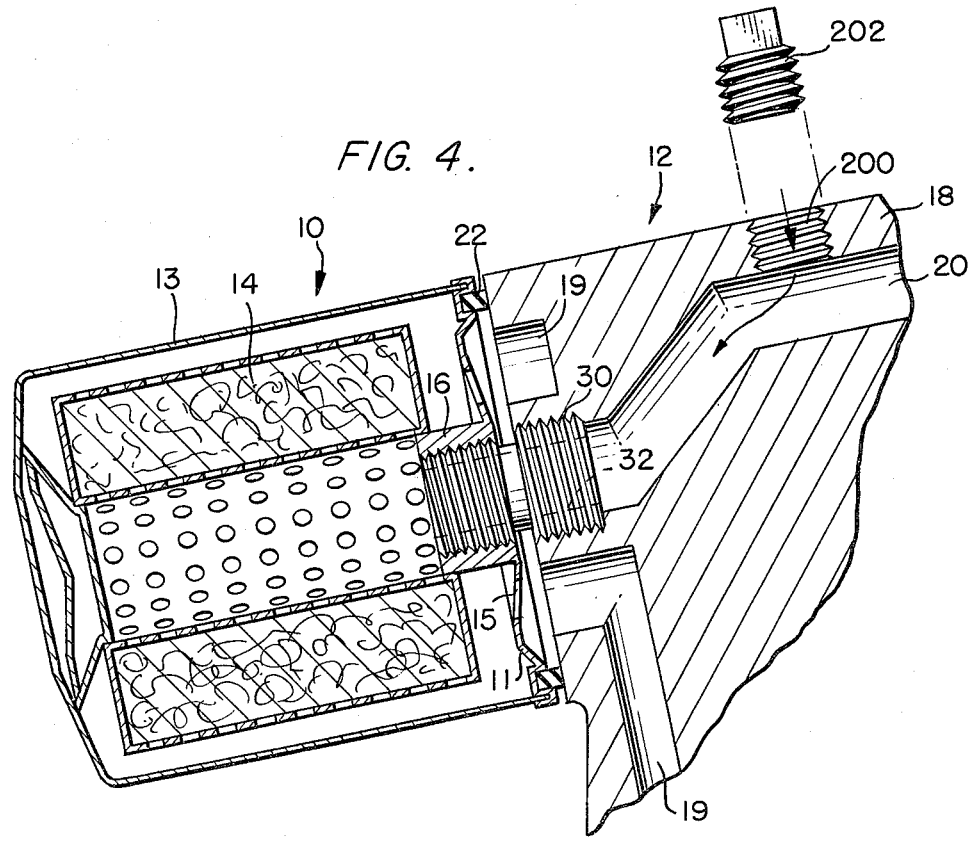
FIG. 4 is a cross-sectional view of a second embodiment of the present invention.

As seen in FIG. 4, a second embodiment for charging filter 10 with oil comprises a port 200 located directly in engine block 18. In this embodiment, filter 10 is attached to block 14 in a standard fashion, namely by means of an engine mounting nipple 32 which matingly fits into engine block hole 30 and central mounting hole 16 of filter 10. Port 200 is drilled and tapped into block 18 in fluid communication with one of the oil passages, as shown with outlet passage 20, thereby being in fluid communication with filter 10. A plug 202 is adapted to matingly fit with port 200 to seal port 200 when in place.

Port 200 and plug 202 operate in much the same manner as adaptor 100. When filter 10 is replaced, plug 202 is removed from port 200. Oil is then manually introduced into port 200, again by any suitable means such as a funnel, spout, or oil pump gun, and travels through outlet passage 20 towards engine nipple 32. The oil passes through nipple 32 and charges filter 10 with oil. After the filter 10 is charged with oil, plug 202 is replaced into port 200. Again, oil is readily available to engine 12 upon start-up so that minimum engine wear occurs.

Figure 5:
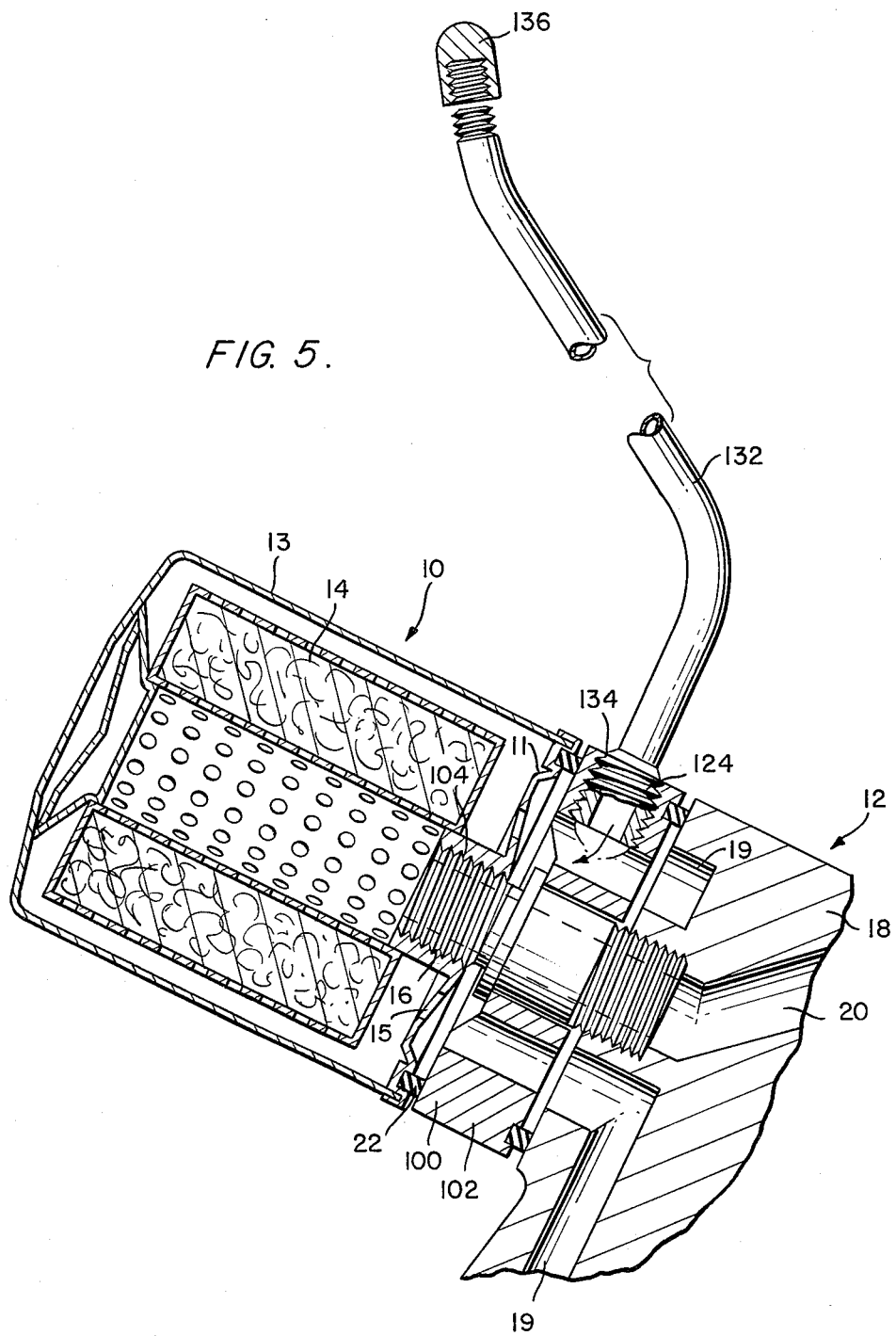
FIG. 5 is a cross-sectional view of a modification of the embodiment of FIGS. 1, 2 and 3.
Figure 6:
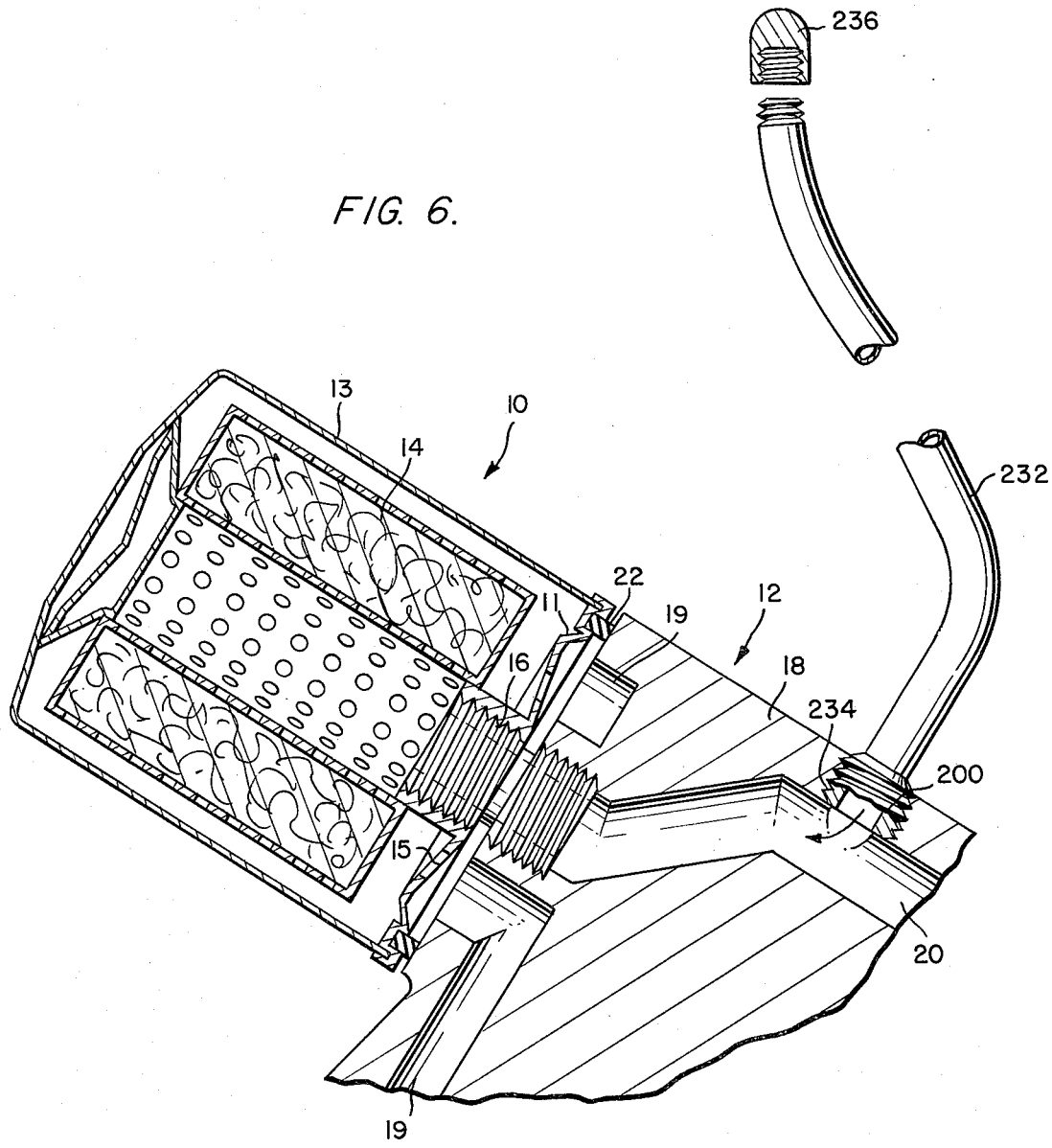
FIG. 6 is a cross-sectional view of a modification of the embodiment of FIG. 4.

A modification may be made to the two above described embodiments to allow oil filters with elevated top portions to be charged with oil. As seen in FIGS. 5 and 6, an upwardly extending conduit or tube and cap can be added. FIG. 5 shows an extension tube 132 that is coupled to port 124 by means of a threaded nipple 134, although any suitable means of attachment can be used. Tube 132 extends upwardly to a height above filter 10 so that oil will be induced to flow into filter 10. A cap 136 seals tube 132, when in place, to prevent leakage. As seen in FIG. 6, an upwardly extending tube 232 can be added to port 200, again by means of a threaded nipple 234. The tube 232 should be higher than filter 10 to induce the oil to flow into filter 10. Again, a cap 236 is provided to seal tube 232 when not in use. The operation of extension tube 232 is identical to that of extension tube 132.

Numerous characteristics and advantages of the invention have been set forth in the foregoing description together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extend indicated by the broad general meaning of the terms in which the appended claims are expressed.

I claim:

1. An adaptor for mounting and precharging with oil a spin-on type of oil filter on an internal combustion engine having a lubrication system including oil passages in the engine block, and mounting means on the block for an oil filter, the filter when so mounted being in the flow of the oil and having a threaded central mounting hole in the base thereof, a plurality of other holes in said base annularly disposed about said central mounting hole, and a circular gasket surrounding said plurality of other holes, said mounting means including a threaded nipple adapted to matingly engage said threaded central mounting hole and a sealing surface adapted to sealingly engage said gasket, said adaptor comprising:

(1) a mounting plate adapted to be mounted on said filter mounting means, having:

an engine mating surface adapted to mate with said sealing surface of said mounting means, said engine mating surface having a gasket thereon which forms a tight seal between said mating surface and said sealing surface;

an oil filter mounting surface located on the side of said plate opposite to said engine mating surface;

a central aperture extending through said plate from said engine mating surface to said oil filter mounting surface;

a plurality of plate holes annularly arranged around said plate central aperture and passing through said plate to provide fluid communication between the filter mounting and engine mating surfaces of said plate; and a port in the periphery of said mounting plate in fluid communication with one of said plurality of plate holes;

(2) an adaptor nipple, replacing said threaded nipple in said engine block, having:

a threaded filter engaging portion adapted to matingly engage said threaded central mounting hole in said filter;

a threaded engine mounting portion smaller in diameter than said mounting plate central aperture, which extends through said central aperture and is adapted to matingly engage said engine block; and a retaining flange extending outwardly from said adaptor nipple between said threaded filter engaging portion and said threaded engine mounting portion, for engaging said adaptor plate and retaining it on said engine block; and (3) closure means for sealing said filter port after said filter has been charged with oil.

2. An adaptor in accordance with claim 1 where said mounting plate further comprises a central depression in said oil filter mounting surface encompassing said central aperture and said plurality of plate holes, and providing lateral fluid communication between said plate holes adjacent said oil filter mounting surface, said depression being deeper than the thickness of said retaining flange and wider than the diameter of said flange so that said flange fits within said depression and is recessed in said oil filter mounting surface.

3. An adaptor in accordance with claim 1 wherein said plurality of plate holes are located substantially at the same radial distance from the center of said mounting plate as said plurality of filter holes are located from the center of said filter.

4. An oil filter precharging means in accordance with claim 1 further comprising an extension conduit in fluid communication with said port, extending upwardly therefrom to a height above said oil filter to allow said filter to be precharged with oil, and said closure means closes the open top of said conduit.

* * * * *